Patented Jan. 6, 1942

2,269,397

UNITED STATES PATENT OFFICE 2,269,397

COMPOSITION OF MATTER

John L. Osborne, Elizabeth, N. J., assignor to American Cyanamid Company, New York, N. Y., a corporation of Maine No Drawing. Application July 21, 1939, Serial No. 285,669

4 Claims. (Cl. 167—45)

The present invention relates to a composition useful for destroying vegetation and for other purposes.

The use of ammonium thiocyanate for killing vegetation is known and has come into extended use. The principal difficulty attending the use of this compound is that it is readily decomposable, the nitrogen content of the ammonia constituent forming readily available plant food. It is extremely doubtful if the nitrogen of the thiocyanic radical becomes available for this purpose. As a consequence, while vegetation is killed and the soil substantially sterilized for a short period of time, yet eventually the material applied as a killing agent actually serves as a fertilizer for any weed or other seeds which either may have escaped the killing action thereof or which are subsequently blown or fall onto the soil so treated.

It is a principal object of the present invention to avoid this subsequent fertilizing action as largely as possible.

I have discovered that if metallic thiocyanates and particularly those of the alkaline earth metals, calcium being preferred, are applied to vegetation, not only is it effectively destroyed but there is very little likelihood that the thiocyanate nitrogen will become converted into available plant food. As a matter of fact, the metallic ion in the soil in the combination in which it exists as thiocyanate or subsequent decomposition products, appears to have some potency as a killing agent for vegetation.

To this end, the invention contemplates the use of water soluble metallic thiocyanates as a medium for destroying vegetation.

Of the water soluble metallic thiocyanates, those of the alkali metal or alkaline earth metals are preferred because of their cheapness and ease of preparation.

Of the alkaline earth metal thiocyanates, I prefer the calcium salt.

This may be conveniently prepared by mixing 3.3 parts of ground sulfur in 23 parts of water until the sulfur is fairly wet. To this wetted sulfur is then added ten parts of a composition on the market known as "Aerobrand" calcium cyanide, which consists predominantly of calcium cyanide, sodium chloride, lime, graphite and other impurities. This calcium cyanide is applied to the mix at a controlled rate in order to avoid any excessive rise in temperature. When a temperature of 80 to 100° C. has been reached by reason of heat of reaction and/or application of steam, the mix is filtered, leaving the insolubles in the cake. The solution contains about 25% calcium thiocyanate and about 10% sodium chloride.

The above solution is useful as a vegetation killer as such, due not only to its content of calcium thiocyanate but also as it contains a large proportion of sodium chloride.

Since the calcium thiocyanate is superior to the sodium chloride as a vegetation killer, I may, if desired, concentrate the solution to the point where a part or all of the sodium chloride will precipitate, due to its lesser solubility. Concentration of these solutions will be of particular advantage when they are to be shipped for considerable distances.

Other alkali metal or alkaline earth metal thiocyanates may be prepared by any desired method, the processes for which form no part of the present invention. All such thiocyanates are considerably more useful than ammonium thiocyanate for this purpose, although for ease of preparation and availability, I prefer the 25% solution of calcium thiocyanate with a content of 10% of sodium chloride.

The relative proportion of this material to be used will be entirely dependent upon the character and abundance of the vegetation growth.

While the invention has been described with specific reference to particular embodiments, it is to be understood that it is not to be limited thereto but is to be construed broadly and restricted solely by the scope of the appended claims.

I claim:

1. A vegetation killing composition including water soluble calcium thiocyanate in an effective amount.

2. A vegetation killing composition including a 25% solution of calcium thiocyanate.

3. A vegetation killing composition including an aqueous solution of calcium thiocyanate in an effective amount and salt.

4. A vegetation killing composition including an aqueous solution containing 25% calcium thiocyanate and 10% salt.

JOHN L. OSBORNE.